United States Patent [19]
Scavo

[11] Patent Number: 6,021,637
[45] Date of Patent: Feb. 8, 2000

[54] INTEGRATED FLUIDIC CD NOZZLE FOR GAS TURBINE ENGINE

[75] Inventor: Steven Scavo, Mason, Ohio

[73] Assignee: General Electric Company, Cincinnati, Ohio

[21] Appl. No.: 08/939,799

[22] Filed: Sep. 29, 1997

[51] Int. Cl.[7] .................................................. F02K 1/30
[52] U.S. Cl. ...................................... 60/262; 239/265.17
[58] Field of Search ............................ 60/231, 262, 266; 239/127.3, 265.17, 265.23

[56] References Cited

U.S. PATENT DOCUMENTS

| | | |
|---|---|---|
| 2,763,984 | 9/1956 | Kadosch et al. .................. 239/265.17 |
| 3,000,178 | 9/1961 | Logerot . |
| 3,288,373 | 11/1966 | Pike . |
| 3,325,103 | 6/1967 | Abbott . |
| 3,370,794 | 2/1968 | Drewry et al. . |
| 3,390,837 | 7/1968 | Freeman ............................ 239/265.17 |
| 3,409,228 | 11/1968 | Mehr ........................................ 60/262 |
| 3,979,065 | 9/1976 | Madden ................................ 239/127.3 |
| 4,072,008 | 2/1978 | Kenworthy et al. ...................... 60/261 |
| 4,203,286 | 5/1980 | Warburton ................................ 60/266 |
| 4,409,788 | 10/1983 | Nash et al. ............................. 60/226.3 |
| 4,707,981 | 11/1987 | Wagner ............................... 239/265.17 |
| 5,664,415 | 9/1997 | Terrier . |

FOREIGN PATENT DOCUMENTS 618830  4/1961  Canada .

OTHER PUBLICATIONS

Catt et al, "A Static Investigation of Fixed–Geometry Nozzles using Fluidic Injection for Throat Area Control," AIAA, Jul. 10–12, 1995.
Miller et al, "Conceptual Development of Fixed–Geometry Nozzles using Fluidic Injection for Throat Area Control," AIAA, Jul. 10–12, 1995.
Traeger, Aircraft Gas Turbine Engine Technology, 1979, pp. 152–155, 390, 391, 400, & 412.
United Aircraft Corporation, "A Theoretical and Experimental Study of Thrust Vector Control by Secondary Gas Injection," Report B910063–9, 1963, pp. cover, 25, 28, Figs 1, 18, & 19.
Guhse, "An Experimental Investigation of Thust Vector Control by Secondary Injection," NASA CR–297, older than 1 year, pp. cover, 21, 22, & 27.
Federspiel, "Fluidic Control of Nozzle Flow–Some Performance Measurements," AIAA 95–2605, Jul. 10–12, 1995, pp. cover and 1–8.

Primary Examiner—Louis J. Casaregola
Attorney, Agent, or Firm—Andrew C. Hess; Rodney M. Young

[57] ABSTRACT

An exhaust nozzle for a gas turbine engine includes converging and diverging nozzles joined together at a throat and attached to a frame. An injection slot is disposed at the throat in flow communication with a transition duct for channeling injection air therethrough as controlled by an injection valve for fluidically varying throat area for exhaust gases discharged through the exhaust nozzle.

20 Claims, 4 Drawing Sheets

INTEGRATED FLUIDIC CD NOZZLE FOR GAS TURBINE ENGINE

CROSS REFERENCE TO RELATED APPLICATION

This application is related to concurrently filed applications Ser. No. 08/939,384 entitled "Fluidic Throat Exhaust Nozzle;" and Ser. No. 08/939,797 entitled "Faceted Exhaust Nozzle."

The US Government has rights in this invention in accordance with Contract No. F33615-92-C-2210 awarded by the Department of the Air Force.

BACKGROUND OF THE INVENTION

The present invention relates generally to gas turbine engines, and, more specifically, to variable area exhaust nozzles therefor.

One type of turbofan gas turbine engine for powering an aircraft in flight includes an afterburner or augmenter for providing additional thrust when desired, with a variable area exhaust nozzle disposed at the aft end thereof. Since the engine operates at varying power levels including idle, cruise, and maximum afterburner, the exhaust nozzle is suitably adjustable for optimizing performance with maximum efficiency.

A typical variable area exhaust nozzle is an assembly including a converging duct or nozzle defined by a plurality of circumferentially adjoining primary exhaust flaps pivoted at their leading edges to an outer casing. A diverging duct or nozzle is defined by a plurality of circumferentially adjoining secondary exhaust flaps pivoted at their leading edges to the trailing edges of the primary flaps. The trailing edges of the secondary flaps are pivotally joined to a plurality of circumferentially adjoining outer flaps which in turn are joined to the outer casing. The converging-diverging (CD) nozzle includes an inlet at the entrance to the converging nozzle, a throat of minimum flow area, designated $A_8$, at the juncture between the converging and diverging nozzles, and an outlet having a larger flow area, designated $A_9$.

During operation, suitable actuators pivot radially inwardly and outwardly the primary flaps to adjust the angle of convergence and the throat area, and in turn adjust the angle of divergence of the secondary flaps and the outlet area. In this way, the exhaust gases from the engine may be accelerated in the converging nozzle to a choked velocity of Mach 1 at the throat, and then expanded in the diverging duct at supersonic velocities for enhanced performance.

The resulting variable area exhaust nozzle is relatively complex in construction and requires many individual components pivotally joined together, and adjusted in position using suitable actuators and linkages. The individual primary and secondary flaps must be suitably cooled and sealed at their junctions to control undesirable leakage of the exhaust gases therebetween.

Fixed area exhaust nozzles are also known but are used in less demanding applications. For example, a simple converging nozzle may be used without a cooperating diverging nozzle, with fixed inlet and throat flow areas. Or, a fixed diverging nozzle may be used in conjunction with the fixed converging nozzle with the flow areas at the inlet, throat, and outlet also being fixed and therefore optimized for only a single region of engine performance. Fixed area CD nozzles are therefore not practical or desirable for an aircraft engine operating over a wide range of power in its flight envelope.

Accordingly, it is desired to have a relatively simple fixed CD exhaust nozzle with variable flow area capability for enhancing engine performance without complex area control mechanisms and attendant weight.

SUMMARY OF THE INVENTION

An exhaust nozzle for a gas turbine engine includes converging and diverging nozzles joined together at a throat and attached to a frame. An injection slot is disposed at the throat in flow communication with a transition duct for channeling injection air therethrough as controlled by an injection valve for fluidically varying throat area for exhaust gases discharged through the exhaust nozzle.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
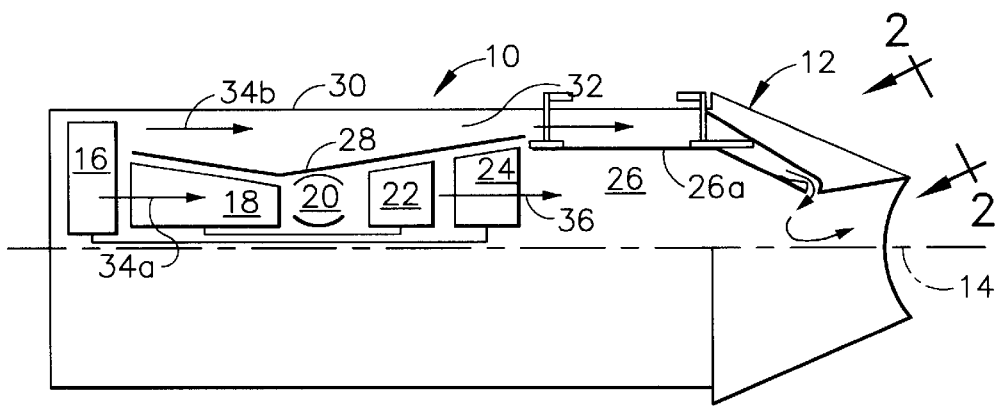
FIG. 1 is a schematic representation of an exemplary augmented turbofan aircraft gas turbine engine having a variable area exhaust nozzle in accordance with an exemplary embodiment of the present invention.

Illustrated schematically in FIG. 1 is a turbofan aircraft gas turbine engine 10 including a variable area converging-diverging (CD) exhaust nozzle 12 in accordance with an exemplary embodiment of the present invention. The engine 10 is axisymmetrical about a longitudinal or axial centerline axis 14 and includes in serial flow communication a fan 16, multi-stage axial compressor 18, annular combustor 20, high pressure turbine (HPT) 22, low pressure turbine (LPT) 24, and an afterburner or augmenter 26. The HPT 22 is suitably joined to the compressor 18 by one rotor shaft, and the LPT 24 is suitably joined to the fan 16 by another rotor shaft. An annular inner casing 28 surrounds the core engine downstream of the fan 16, and the augmenter 26 includes an annular combustion liner 26a. The inner casing 28 and augmenter liner 26a are spaced radially inwardly from an annular outer casing 30 to define an annular bypass duct 32 extending from the fan 16 to the exhaust nozzle 12.

During operation, ambient air enters the engine 10 and is compressed in the compressor 18 for providing pressurized or compressed air 34a which is mixed with fuel in the combustor 20 and ignited for generating hot combustion gases 36 which flow through the HPT 22 and LPT 24 which extract energy therefrom and discharge the exhaust gases into the augmenter 26 for discharge from the engine through the exhaust nozzle 12. The HPT 22 powers the compressor 18, and the LPT 24 powers the fan 16.

The fan 16 pressurizes a portion of the inlet air as compressed bypass air 34b which bypasses the core engine and flows through the bypass duct 32 around the augmenter liner 26a to the exhaust nozzle 12.

But for the exhaust nozzle 12, the gas turbine engine 10 illustrated in FIG. 1 is conventional in configuration and operation, and is operable over varying output power settings including idle, cruise, and maximum afterburner. Accordingly, the exhaust nozzle 12 is variable in flow area in accordance with the present invention for enhancing efficiency of the engine 10 over its operating range.

Figure 2:
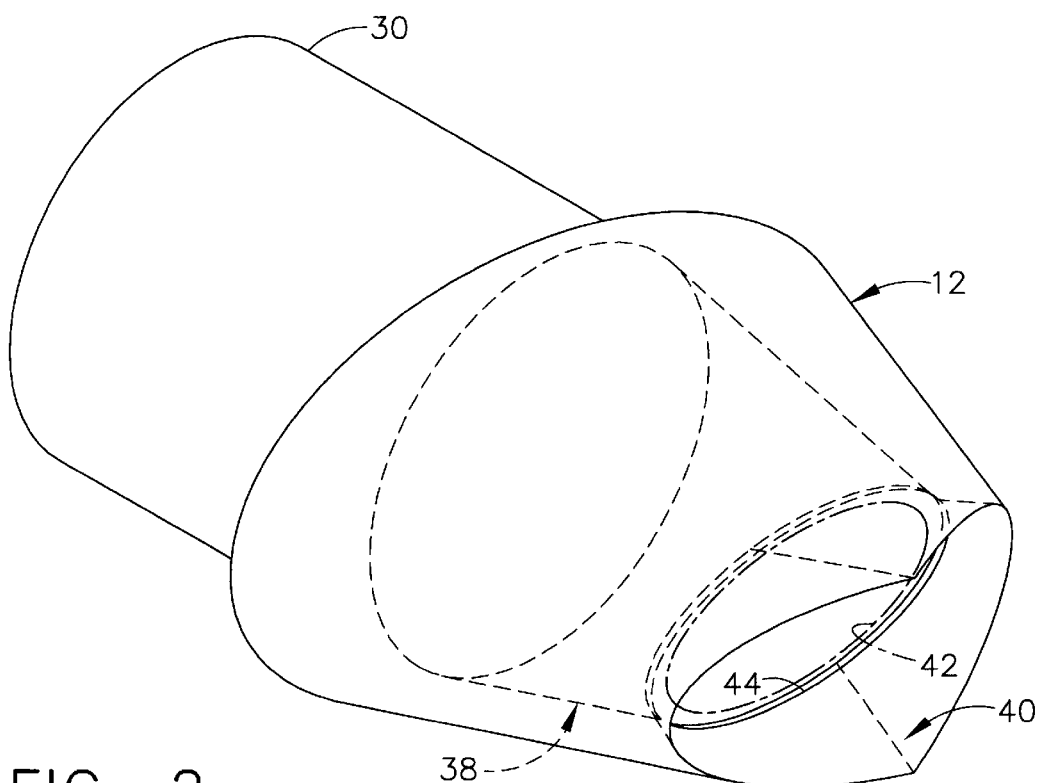
FIG. 2 is an isometric view of the exhaust nozzle illustrated in FIG. 1 in the general direction indicated by line 2—2.
Figure 3:
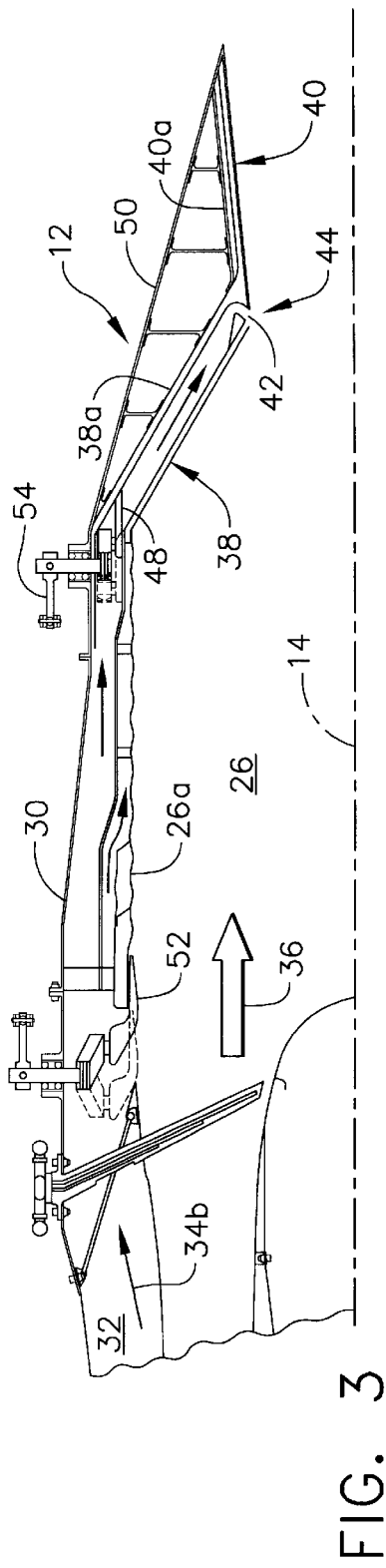
FIG. 3 is an enlarged axial view of the engine afterburner and exhaust nozzle illustrated in FIG. 1.
Figure 4:
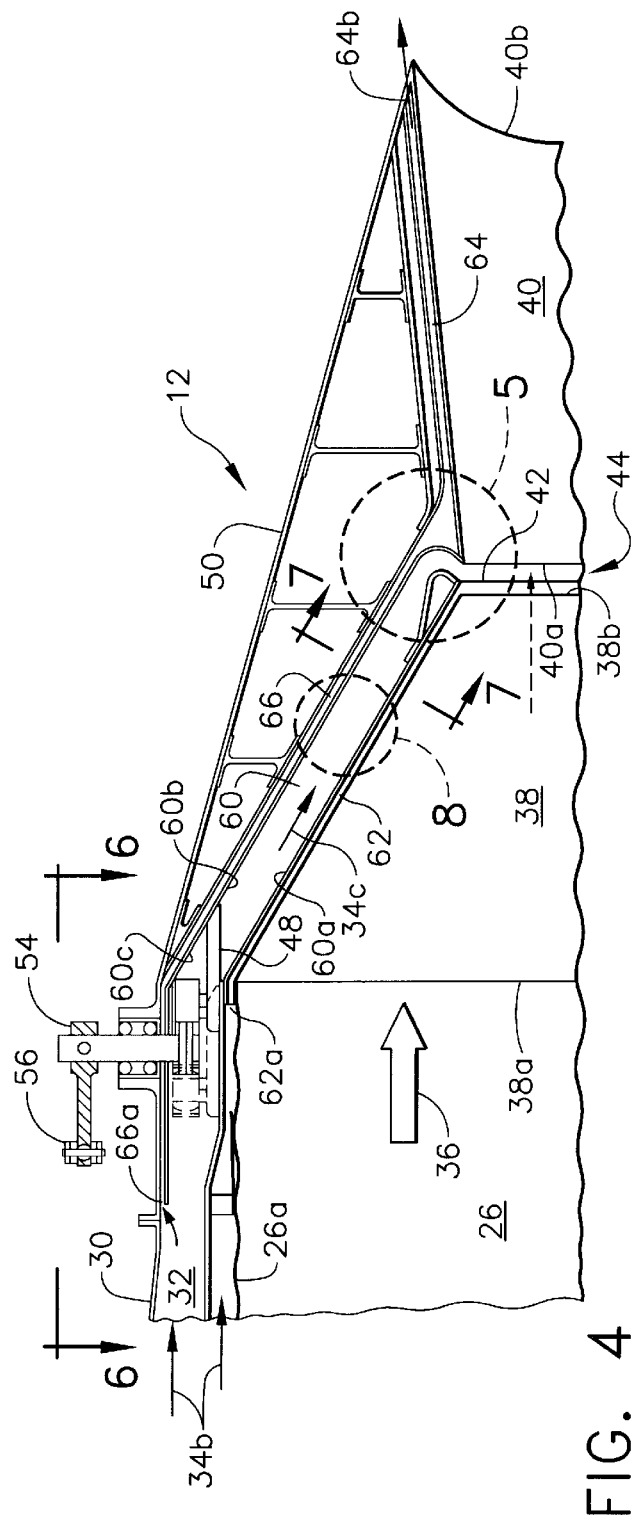
FIG. 4 is an enlarged axial view of the exhaust nozzle illustrated in FIG. 3.

More specifically, and referring to FIGS. 2–4, the exhaust nozzle 12 is an assembly of components including a fixed, non-variable converging inlet channel or nozzle 38 disposed in flow communication with the augmenter 26 for receiving the exhaust gases 36 therefrom. Disposed in flow communication coaxially with the converging nozzle 38 about the engine centerline axis 14 is a fixed, non-variable diverging outlet channel or nozzle 40 which joins the converging nozzle 38 at an annular throat 42 having a minimum flow area designated $A_8$.

In the exemplary embodiment illustrated in FIG. 4, the converging nozzle 38 has a circular or cylindrical forward end 38a defining an inlet for receiving the exhaust gases 36 from the augmenter 26 during operation. The cylindrical forward end 38a transitions to an elliptical aft end 38b at the throat 42. The converging nozzle 38 converges in area between the forward and aft ends 38a,b thereof in a fixed area ratio of suitable value.

The diverging nozzle 40 is correspondingly elliptical from its forward end 40a at the throat 42 to its aft end 40b, and diverges therebetween at a fixed diverging area ratio of suitable value. As shown in FIG. 2, the exhaust nozzle 12 transitions from the circular profile to the elliptical profile, with the major axis of the ellipse being in the horizontal plane, and the minor axis of the ellipse being in the vertical plane. However, the specific configuration or profile of the exhaust nozzle 12 may be otherwise selected as desired to include completely circular, rectangular, or other profiles, for example, for each specific nozzle configuration desired.

However, in all embodiments the converging and diverging nozzles 38, 40 are fixed, non-variable flow ducts. In order to provide variable area capability of the otherwise fixed area CD exhaust nozzle 12, the nozzle 12 further includes a circumferentially extending annular injection slot 44 disposed coaxially at the throat 42 as initially shown in FIGS. 2–4. Cooperating with the injection slot 44 are suitable means for selectively injecting compressed air, such as the bypass air 34b in the engine 10, through the injection slot 44 for selectively and fluidically varying the effective flow area $A_8$ for the exhaust gases 36 at the throat 42. By injecting the bypass air, designated injection air 34c, at the throat 42 with suitable momentum, the available flow area for the exhaust gases 36 may be reduced for effectively varying the throat area $A_8$ fluidically instead of mechanically with a solid boundary.

Figure 5:
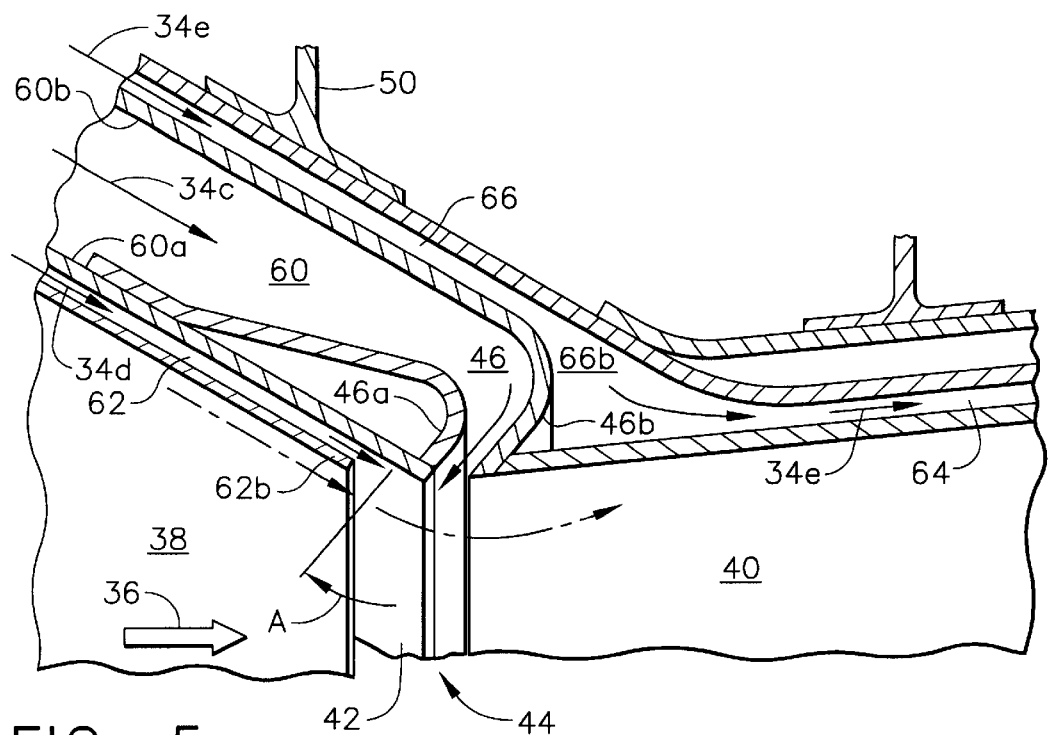
FIG. 5 is an enlarged axial view of an injection slot in accordance with an exemplary embodiment of the present invention disposed at a throat between converging and diverging nozzles of the exhaust nozzle illustrated in FIG. 3 within the circle labeled 5.

A portion of the injecting means in accordance with a preferred embodiment of the present invention is illustrated in more particularity in FIG. 5. The injecting means preferably includes a radially inwardly extending converging injection nozzle 46 which terminates at the injection slot 44 defining an outlet therefor. The injection air 34c may therefore be injected with choked flow at a desired design point for maximizing fluidic area change.

The injection nozzle 46 is preferably directed in part at its radially inner portion axially forward toward the injection slot 44 to define an upstream injection angle A which is preferably as close to 90° as practical, with zero degrees (0°) being radially inward, and has a value of about 60°, for example, from the radial axis for injecting the compressed injection air 34c in an initial upstream direction in the converging nozzle 38.

The injection air 34c has suitable momentum to create a buffer or recirculation zone of primarily only the injection air 34c radially inwardly of the injection slot 44 to fluidically constrict the flow of exhaust gases 38 to a smaller effective area $A_8$ at the physical throat 42. The physical throat 42 defines the maximum value of the throat area $A_8$, whereas the maximum injection of the injection air 34c defines the minimum value of the effective throat area $A_8$.

The injection air 34c is preferably directed from the injection slot 44 initially in the upstream direction relative to the exhaust gases 36 to maximize the reduction affect in throat flow area $A_8$. Initially directing the injection air 34c in the downstream direction from the slot 44 and into the diverging nozzle 40 is not desirable due to the inherent gas expansion therein which would entrain therewith the injection air 34c minimizing its affect for throat flow area control.

The injection nozzle 46 may include a first or axially forward flow guide 46a which is generally arcuate or convex in radial section for turning the injection air 34c from aft to forward directions. A second or axially aft flow guide 46b is spaced axially aft from the forward guide 46a, and is complementary therewith to converge in flow area radially inwardly from a guide inlet to the injection slot 44 which defines the guide outlet at the throat 42. The forward and aft flow guides 46a,b are preferably configured to effect the injection angle A of about 60° in the preferred embodiment.

Figure 6:
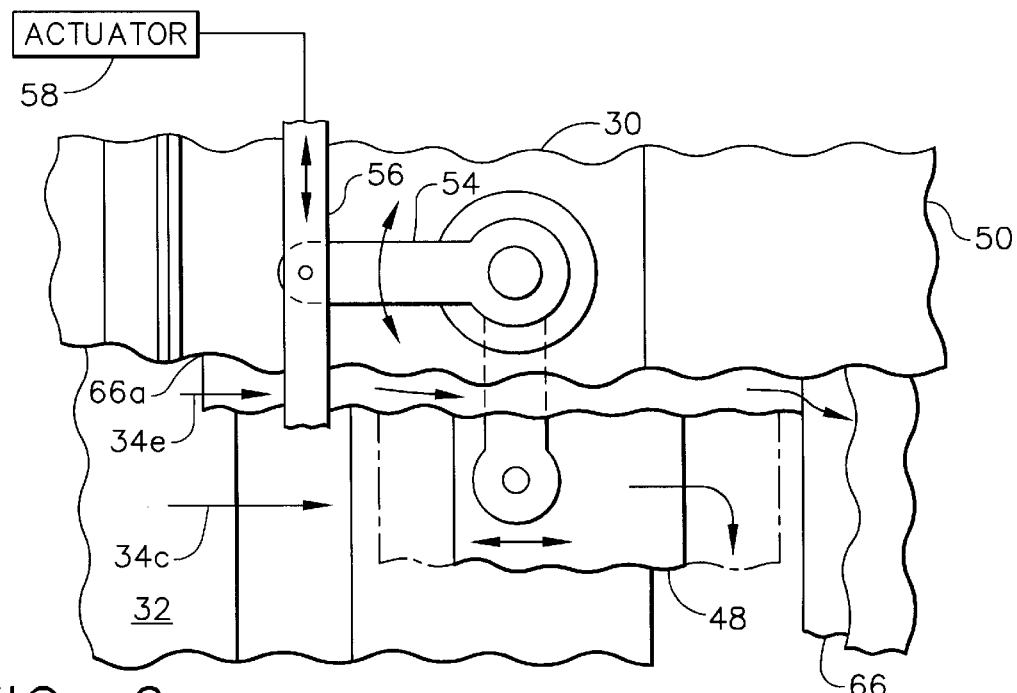
FIG. 6 is a top view of a portion of an injection valve for controlling injection air through the injection slot, and taken generally along line 6—6 in FIG. 4.

As shown in FIGS. 4 and 6, the injecting means preferably also include an annular injection valve 48 disposed at the forward end of the exhaust nozzle 12 for controlling flow of the injection air 34c through the injection slot 44 for in turn fluidically varying the effective flow area ($A_8$) available for the exhaust gases 36 at the physical throat 42. A significant objective of the present invention is to integrate fluidic area control and nozzle cooling into a lightweight production-type design which efficiently utilizes available space for maximizing aerodynamic and structural efficiency.

More specifically, the exhaust nozzle 12 preferably includes an annular stationary frame 50 suitably joined coaxially with the outer casing 30 for providing structural integrity of the nozzle 12. The frame 50 may take any suitable form including a plurality of axially spaced apart, annular bulkheads or ribs having I-beam sections suitably attached to radially outer and inner walls.

The converging nozzle 38 is preferably in the form of a thin liner suitably joined to the frame 50 at a forward end thereof in flow communication with the augmenter liner 26a for receiving the exhaust gases 36 from the engine. The diverging nozzle 40 is also preferably in the form of a thin liner suitably joined to the frame 50 at an aft end thereof in flow communication with the converging nozzle 38 at the throat 42.

The frame 50 has a suitable configuration or profile for mounting the converging and diverging nozzles 38, 40 at a predetermined orientation for effecting desired amounts of converging flow area through the converging nozzle 38 and diverging flow area through the diverging nozzle 40 for each particular engine application. In this way, the converging and diverging nozzles 38, 40 are fixed to the frame 50 with a specific area ratio which may be selected for a specific operating point in the flight envelope of the engine 10. Variability of the CD nozzle 12 is provided by suitably adjusting the injection valve 48 for controlling flow of the injection air 34c through the injection slot 44 as required for other operating points in the flight envelope.

As shown in FIG. 3, the engine 10 may also include a conventional variable area bypass injector (VABI) valve 52 at the forward end of the augmenter liner 26a for use in conventionally controlling the variable cycle of the engine 10. The VABI valve 52 is in the exemplary form of a cylindrical sleeve which translates axially by a plurality of circumferentially spaced apart bellcranks which are suitably rotated from outside the casing 30 by conventional actuators.

In the preferred embodiment illustrated in FIGS. 3 and 4, the injection valve 48 may be similar in configuration and operation to the VABI valve 52, with the injection valve 48 being a cylindrical sleeve joined to a plurality of circumferentially spaced apart bellcranks 54 which extend through the outer casing 30 and are suitably pivotally joined thereto. The bellcranks 54 are suitably joined to an actuation link 56 which is illustrated in more particularity in FIG. 6. The actuation link 56 may be an arcuate or annular member suitably joined to one or more conventional actuators 58 which have extendable output rods suitably joined to the link 56 for selectively rotating the link around the centerline axis of the engine. As the link 56 is rotated, the respective bellcranks 54 are rotated for in turn axially translating the injection valve 48 between open and closed position as illustrated in phantom line in FIG. 6.

As shown in FIG. 3, both the injection valve 48 and VABI valve 52 may be moved to their "off" positions shown in solid line during operation of the augmenter 26, with the injection valve 48 closing off flow through the injection slot 44, and the VABI valve 52 allowing a portion of the bypass air 34b to enter the augmenter 26 radially inwardly of its liner 26a. In an opposite "on" position shown in phantom during dry engine operation, the injection valve 48 allows airflow through the injection slot 44, with the VABI valve 52 blocking bypass air flow inside the augmenter 26. However, the functions of the injection valve 48 and the VABI valve 52 may be combined if practical.

In order to integrate air injection and nozzle cooling, the exhaust nozzle 12 as illustrated in FIG. 4 preferably includes an annular transition duct 60 disposed radially between the frame 50 and the converging nozzle 38 in flow communication with the injection slot 44. The transition duct 60 is defined by radially spaced apart inner and outer walls 60a,b. The transition duct 60 has an annular inlet at its forward end at which the injection valve 48 is disposed for controlling the area thereof and flow of the injection air 34c through the transition duct 60 and out the injection slot 44 defined at the outlet of the transition duct 60. In this way, the momentum of the injected air 34c may be used for fluidically varying the flow area of the exhaust gases 36 at the throat 42.

As shown in FIGS. 4 and 5, the liner defining the converging nozzle 38 is spaced radially inwardly from the inner wall 60a of the transition duct 60 to define a converging liner duct 62 for channeling therethrough cooling air 34d, shown in more particularity in FIG. 5. The converging liner duct 62 is suitably disposed in flow communication with the bypass duct 32 for receiving a portion of the bypass air 34b therefrom.

As shown in FIGS. 4 and 5, the liner of the diverging nozzle 40 is spaced radially inwardly from the inner wall of the frame 50 to define a diverging liner duct 64 for channeling therethrough cooling air 34e which is another portion of the bypass air 34b from the bypass duct 32.

The transition duct 60 is also spaced radially inwardly from the inner wall of the frame 50 to define a feed duct 66 disposed in flow communication with the diverging liner duct 64 for channeling the cooling air 34e thereto and jumping or bypassing the injection slot 44.

The transition duct 60, converging liner duct 62, diverging liner duct 64, and feed duct 66 are preferably annular channels which follow the respective configurations of the converging and diverging nozzles 38, 40 as they transition from cylindrical to elliptical. The converging liner duct 62 has an annular inlet 62a, as shown in FIG. 4, disposed in flow communication with the bypass duct 32 for receiving a portion of the bypass air 34b. In the exemplary embodiment illustrated in FIG. 4, the afterburner liner 26 has a double wall construction through which a portion of the bypass air 34b is suitably channeled to the converging liner duct 62 throughout engine operation.

The feed duct 66 has a cylindrical inlet 66a inside the outer casing 30 disposed in flow communication with the bypass duct 32 for receiving the cooling air 34e therefrom independently of the cooling air 34d received by the converging liner duct 62. And, the transition duct 60 includes an annular inlet 60c in which the injection valve 48 is disposed, with the inlet 60c being disposed in flow communication with the bypass duct 32 for receiving a portion of the bypass air 34b for injection through the slot 44.

As shown in FIG. 5, the converging liner duct 62 has an annular outlet 62b disposed immediately upstream of the injection slot 44 for discharging the cooling air 34d into the exhaust gases 36. The feed duct 66 has an annular outlet 66b disposed downstream of the injection slot 44 in common with an inlet to the diverging liner duct 64 for channeling the cooling air 34e past the injection slot 44 for supplying cooling air to the diverging nozzle 40. As shown in FIG. 4, the diverging liner duct 64 has an annular outlet 64b at the aft end of the diverging nozzle 40 for suitably discharging the cooling air 34e therefrom.

In this way, variable area of the exhaust nozzle 12 may be effected by positioning the injection valve 48 for controlling flow of the injection air 34c through the injection slot 44. The discrete auxiliary ducts 62, 64, and 66 independently channel portions of the bypass air 34b for cooling both the converging and diverging nozzles 38, 40 irrespective of airflow through the transition duct 60. When the injection valve 48 is closed, airflow through the transition duct 60 is curtailed, yet cooling is still effected by the converging liner duct 62, and by the diverging liner duct 64 fed by the feed duct 66 while continuously receiving air from the bypass duct 32.

Figure 7:
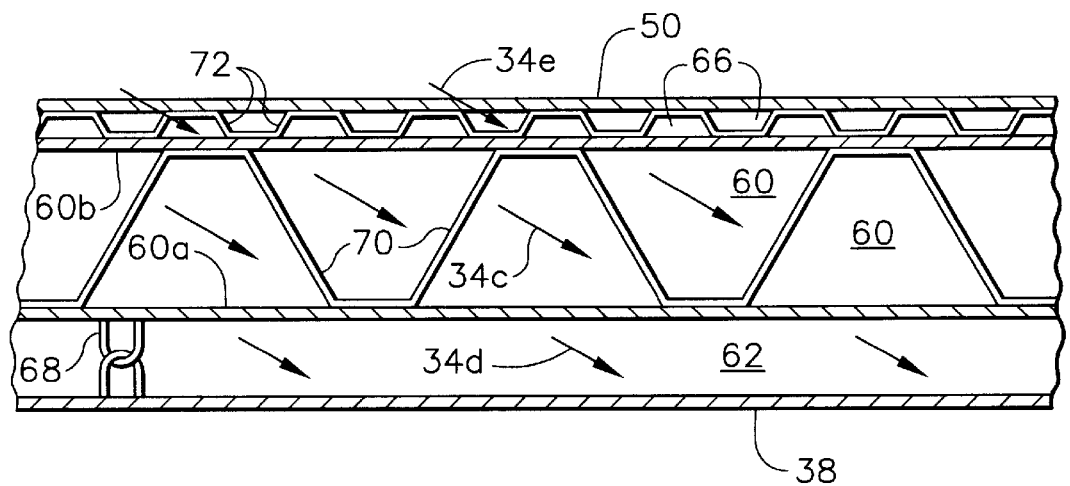
FIG. 7 is a radial sectional view through the converging nozzle portion of the exhaust nozzle illustrated in FIG. 4 and taken along line 7—7.

As shown in FIG. 7 in more detail, the three ducts 60, 62, and 66 are configured in a unique structural assembly which integrates the several nozzle cooling and injection circuits in a lightweight and structurally efficient manner. More specifically, the inner wall 60a of the transition duct 60 is spaced radially outwardly from the converging nozzle liner 38 to define the converging liner duct 62 using suitable support hangers 68. The outer wall 60b of the transition duct 60 is spaced radially inwardly from the inner wall of the frame 50 to define the feed duct 66, and is also spaced radially outwardly from the inner wall 60a to define the flow channel of the transition duct 60.

A plurality of support ribs or trusses 70 extend radially between the inner and outer walls 60a,b and are suitably joined thereto by welding, brazing, or fasteners, for example. The support ribs 70 are spaced circumferentially apart from each other for channeling the injection air 34c therebetween in a plurality of airflow passages which collectively feed the injection slot 44.

Similarly, a plurality of support ribs or trusses 72 extend radially between the frame 50 and the transition duct outer wall 60b and are suitably joined thereto. The support ribs 72 are circumferentially spaced apart from each other to provide a plurality of airflow passages which collectively define the feed duct 66. The support ribs 70, 72 provide a lightweight, strong integrated assembly for accommodating the pressure and operating loads during operation while channeling airflow uniformly circumferentially around the nozzle. The diverging nozzle liner 40 may be similarly supported to the frame 50 by corresponding support ribs in a manner similar to that illustrated in FIG. 7 for the converging nozzle liner 38.

The multiple radial and circumferential flow passages illustrated in FIG. 7 provide enhanced cooling of the various components thereof during engine operation and reduce or eliminate thermal gradients. The use of dedicated or additional types or plenums is eliminated by using the internal passages defined by the various support ribs, which therefore eliminates components and reduces weight.

Figure 8:
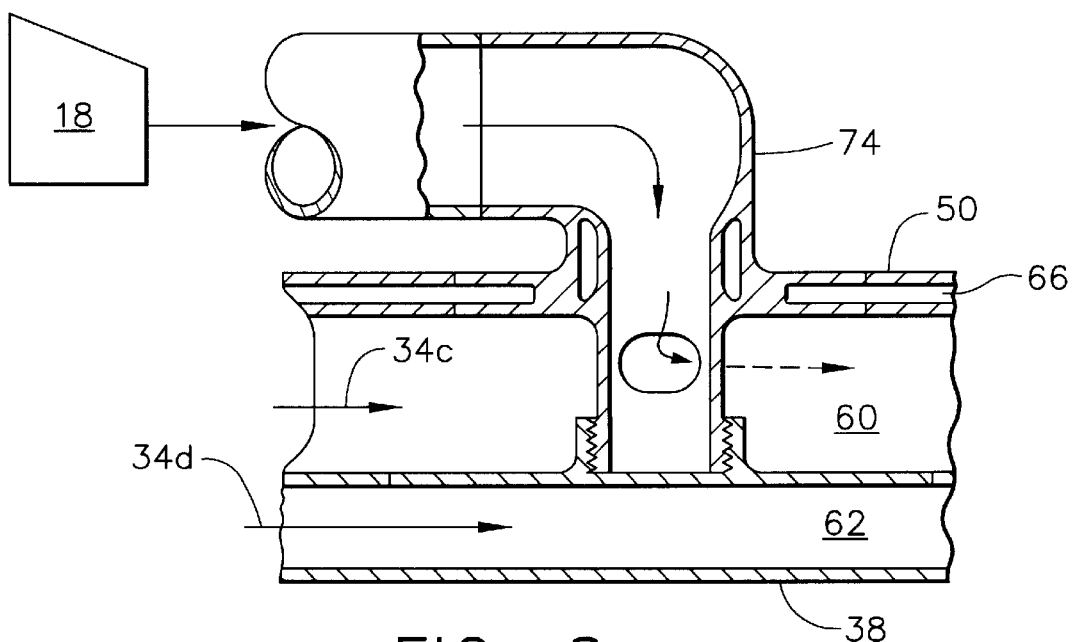
FIG. 8 is an elevational sectional view through a portion of the converging nozzle illustrated in FIG. 4 in the circle labeled 8 showing an alternate embodiment of the present invention for additionally injecting compressor discharge air through the injection slot.

Since the degree of variable area effected by the injection slot 44 is dependent upon momentum of the injection air 34c injected therethrough, the available pressure of the bypass air 34b therefore limits variability. In order to increase the degree of variability, the exhaust nozzle 12 may further include one or more injection ports 74, as illustrated in FIG. 8, suitably disposed in flow communication with the transition duct 60 and with the compressor 18 for channeling a portion of the compressor discharge air into the transition duct 60 to supplement the bypass air 34c being channeled through the injection slot 44.

In this way, the highest available pressurized air from the compressor 18 may be additionally used for increasing the momentum of the air injected through the injection slot 44 for enhancing throat area variability during operation. The injection port 74 may be in the form of a simple fitting extending through the outer wall 60b of the transition duct 60 joined to a suitable pipe or conduit routed through the inside of the frame 50 and along the outer casing 30 of the engine illustrated in FIG. 1 to the compressor 18 for receiving a portion of the discharge air therefrom.

The improved variable area CD exhaust nozzle 12 disclosed above provides fluidic variable area control with otherwise fixed geometry converging and diverging nozzles 38, 40 mounted to a stationary frame 50. The nozzle assembly effectively utilizes the various support ribs and dividing walls for defining the various independent flow circuits required for fluidic area control and cooling of the nozzle 12 itself during operation. The advantages of a variable cycle engine may also be obtained for the relatively simple and lightweight nozzle 12.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. An exhaust nozzle for a gas turbine engine comprising:
   an annular frame;
   a converging nozzle disposed at a forward end of said frame for receiving exhaust gases from said engine;
   a diverging nozzle disposed at an aft end of said frame in flow communication with said converging nozzle at a throat;
   a circumferentially extending injection slot disposed at said throat;
   an annular transition duct disposed radially between said frame and said converging nozzle, and in flow communication with said injection slot; and
   an injection valve disposed at an inlet of said transition duct for controlling flow of injection air through said transition duct and out said injection slot for varying flow area of said exhaust gases at said throat.

2. An exhaust nozzle for a gas turbine engine comprising:
   an annular frame;
   a converging nozzle disposed at a forward end of said frame for receiving gases from said engine;
   a diverging nozzle disposed at an aft end of said frame in flow communication with said converging nozzle at a throat;
   a circumferentially extending injection slot disposed at said throat;
   an annular transition duct disposed radially between said frame and said converging nozzle, and in flow communication with said injection slot; and
   an injection valve disposed at an inlet of said transition duct for controlling flow of injection air through said transition duct and out said injection slot for varying flow area of said exhaust gases at said throat; and
   wherein:
   said converging nozzle comprises a liner spaced radially inwardly from said transition duct to define a converging liner duct for channeling cooling air therethrough;
   said diverging nozzle comprises a liner spaced radially inwardly from said frame to define a diverging liner duct for channeling cooling air therethrough; and
   said transition duct is spaced radially inwardly from said frame to define a feed duct disposed in flow communication with said diverging liner duct for channeling said cooling air thereto.

3. A nozzle according to claim 2 wherein said transition duct, converging liner duct, and feed duct have respective inlets for independently receiving air for flow therethrough.

4. A nozzle according to claim 3 wherein:
   said converging liner duct has an outlet disposed upstream of said injection slot; and
   said feed duct has an outlet disposed downstream of said injection slot.

5. A nozzle according to claim 4 further comprising an injection nozzle including:
   a forward flow guide being arcuate in radial section; and
   an aft flow guide spaced axially aft from said forward guide, and being complementary therewith to converge radially inwardly to said injection slot for injecting said injection air thereat.

6. A nozzle according to claim 5 wherein said injection nozzle is directed in part axially toward said injection slot to define an upstream injection angle for said injection air in said converging nozzle.

7. A nozzle according to claim 4 wherein said transition duct comprises:

an inner wall spaced radially outwardly from said converging nozzle liner to define said converging liner duct;

an outer wall spaced radially inwardly from said frame to define said feed duct, and spaced radially outwardly from said inner wall; and a plurality of support ribs extending radially between said inner and outer walls and spaced circumferentially apart for channeling said injection air therebetween.

8. A nozzle according to claim 4 wherein:

said converging nozzle includes a circular forward end and transitions to an elliptical aft end at said throat; and said diverging nozzle is elliptical.

9. A nozzle according to claim 4 wherein:

said engine includes an augmenter having an annular bypass duct therearound for channeling bypass air from a fan thereof; and said inlets of said transition duct, converging liner duct, and feed duct are disposed in independent flow communication with said bypass duct for receiving respective portions of said bypass air therefrom for cooling said liners and for injection through said injection slot.

10. A nozzle according to claim 4 further comprising an injection port disposed in flow communication with said transition duct for channeling thereto compressed air from a compressor of said engine.

11. An exhaust nozzle for a gas turbine engine comprising:

a non-variable converging nozzle for receiving exhaust gases from said engine;

a non-variable diverging nozzle adjoining said converging nozzle at a throat having an injection slot thereat;

a transition duct surrounding said converging nozzle in flow communication with said injection slot; and means for selectively injecting compressed injection air through said transition duct and injection slot for fluidically varying effective flow area at said throat.

12. A nozzle according to claim 11 further comprising a first cooling duct disposed radially between said converging nozzle and said transition duct for channeling cooling air from said engine to cool said converging nozzle.

13. A nozzle according to claim 12 further comprising a second cooling duct surrounding said diverging nozzle and bypassing said transition duct for channeling cooling air from said engine to cool said diverging nozzle.

14. A nozzle according to claim 13 wherein said first and second cooling ducts have corresponding inlets for independently channeling cooling air from said engine to said converging and diverging nozzles, and independently of said transition duct.

15. A nozzle according to claim 13 wherein said injecting means are effective for injecting said injection air through said injection slot with choked flow.

16. A nozzle according to claim 13 wherein said injecting means comprise:

a converging injection nozzle terminating at said injection slot; and an injection valve disposed at an inlet of said transition duct for controlling flow of said injection air through said transition duct and injection nozzle.

17. A nozzle according to claim 16 further comprising a feed duct surrounding said transition duct, and joined in flow communication with said second cooling duct to bypass said transition duct.

18. A nozzle according to claim 17 wherein said converging nozzle, first cooling duct, transition duct, and feed duct are integrally joined together for channeling said cooling air and injection air.

19. A nozzle according to claim 18 further comprising a plurality of radial support ribs joining together said transition and feed ducts, and circumferentially spaced apart from each other for channeling said cooling air and injection air, respectively.

20. A nozzle according to claim 19, wherein said injection nozzle is directed axially forward at said injection slot.

* * * * *